(12) United States Patent
Carlson et al.

(10) Patent No.: US 8,380,629 B2
(45) Date of Patent: Feb. 19, 2013

(54) SEEDING CHALLENGES FOR PAYMENT TRANSACTIONS

(75) Inventors: Mark Carlson, Half Moon Bay, CA (US); Patrick Faith, Pleasanton, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 590 days.

(21) Appl. No.: 12/140,215

(22) Filed: Jun. 16, 2008

(65) Prior Publication Data

US 2008/0319904 A1    Dec. 25, 2008

Related U.S. Application Data (60) Provisional application No. 60/946,113, filed on Jun. 25, 2007.

(51) Int. Cl.
    *G06Q 40/00*          (2012.01)

(52) U.S. Cl. ............... 705/44; 705/39; 705/67; 705/75; 705/23; 705/1.1

(58) Field of Classification Search .............. 705/1, 44, 705/1.1, 67, 75, 39, 26, 64, 53, 72, 17; 713/166, 713/158, 183; 726/2, 3, 12, 15
See application file for complete search history.

(56) References Cited

U.S. PATENT DOCUMENTS

| | | | |
|---|---|---|---|
| 4,528,442 A | 7/1985 | Endo | |
| 5,177,342 A | 1/1993 | Adams | |
| 5,254,843 A | 10/1993 | Hynes et al. | |
| 5,311,594 A | 5/1994 | Penzias | |
| 5,420,926 A | 5/1995 | Low et al. | |
| 5,434,398 A | 7/1995 | Goldberg | |
| 5,465,387 A | 11/1995 | Mukherjee | |
| 5,513,250 A | 4/1996 | McAllister | |
| 5,530,438 A | 6/1996 | Bickham et al. | |
| 5,539,810 A | 7/1996 | Kennedy et al. | |
| 5,615,110 A | 3/1997 | Wong | |
| 5,625,689 A | 4/1997 | Indeck et al. | |
| 5,627,355 A | 5/1997 | Rahman et al. | |
| 5,708,422 A | 1/1998 | Blonder et al. | |
| 5,740,244 A | 4/1998 | Indeck et al. | |
| 5,774,525 A | 6/1998 | Kanevsky et al. | |
| 5,812,668 A | 9/1998 | Weber | |
| 5,819,226 A | 10/1998 | Gopinathan et al. | |
| 5,834,747 A | 11/1998 | Cooper | |
| 5,872,834 A | 2/1999 | Teitelbaum | |
| 5,878,337 A | 3/1999 | Joan et al. | |

(Continued)

FOREIGN PATENT DOCUMENTS

| AU | 2007261072 B2 | 12/2007 |
|---|---|---|
| CA | 2 267 672 A1 | 8/2000 |

(Continued)

OTHER PUBLICATIONS

"Federated ID Facilitates Web Services", By: Rebecca Xiong, Network World, Date: Nov. 29, 2004.*

(Continued)

*Primary Examiner* — John H Holly
(74) *Attorney, Agent, or Firm* — Kilpatrick Townsend & Stockton LLP

(57) ABSTRACT

Systems, methods, and apparatus are provided for authenticating a consumer using challenge questions. A response to a challenge question is verified via seeding the challenge question, receiving response, and deductively determining the answer. The verified response and challenge question may then be used to authenticate a consumer as part of an authorization process.

24 Claims, 7 Drawing Sheets

U.S. PATENT DOCUMENTS

| | | | |
|---|---|---|---|
| 5,903,830 | A | 5/1999 | Joao et al. |
| 5,914,472 | A | 6/1999 | Foladare et al. |
| 5,920,628 | A | 7/1999 | Indeck et al. |
| 5,988,497 | A | 11/1999 | Wallace |
| 6,012,144 | A | 1/2000 | Pickett |
| 6,029,154 | A | 2/2000 | Pettitt |
| 6,064,990 | A | 5/2000 | Goldsmith |
| 6,095,413 | A | 8/2000 | Tetro et al. |
| 6,157,707 | A | 12/2000 | Baulier et al. |
| 6,219,793 | B1 | 4/2001 | Li et al. |
| 6,260,146 | B1 | 7/2001 | Mos et al. |
| 6,263,447 | B1 | 7/2001 | French et al. |
| 6,308,890 | B1 | 10/2001 | Cooper |
| 6,321,339 | B1 | 11/2001 | French et al. |
| 6,327,578 | B1 | 12/2001 | Linehan |
| 6,330,550 | B1 | 12/2001 | Brisebois et al. |
| 6,442,532 | B1 | 8/2002 | Kawan |
| 6,496,936 | B1 | 12/2002 | French et al. |
| 6,529,725 | B1 | 3/2003 | Joao et al. |
| 6,535,855 | B1 | 3/2003 | Cahill et al. |
| 6,612,488 | B2 | 9/2003 | Suzuki |
| 6,684,250 | B2 | 1/2004 | Anderson et al. |
| 6,714,918 | B2 | 3/2004 | Hillmer et al. |
| 6,832,721 | B2 | 12/2004 | Fujii |
| 6,836,670 | B2 | 12/2004 | Casstrogiovanni et al. |
| 6,857,073 | B2 | 2/2005 | French et al. |
| 6,978,308 | B2 | 12/2005 | Boden et al. |
| 7,003,493 | B2 | 2/2006 | Weichert et al. |
| 7,003,497 | B2 | 2/2006 | Maes |
| 7,051,209 | B1 | 5/2006 | Brickell |
| 7,177,830 | B2 | 2/2007 | Shields et al. |
| 7,231,657 | B2 | 6/2007 | Honarvar et al. |
| 7,249,093 | B1 | 7/2007 | King |
| 7,272,728 | B2 | 9/2007 | Pierson |
| 7,273,168 | B2 | 9/2007 | Linlor |
| 7,330,871 | B2 | 2/2008 | Barber |
| 7,343,149 | B2 | 3/2008 | Benco |
| 7,357,310 | B2 | 4/2008 | Calabrese et al. |
| 7,373,669 | B2 | 5/2008 | Eisen |
| 7,430,537 | B2 * | 9/2008 | Templeton et al. ............ 705/39 |
| 7,467,401 | B2 | 12/2008 | Cicchitto |
| 7,500,607 | B2 | 3/2009 | Williams |
| 7,545,748 | B1 | 6/2009 | Riddle |
| 7,548,890 | B2 | 6/2009 | Shakkarwar |
| 7,620,600 | B2 | 11/2009 | Patil et al. |
| 8,135,647 | B2 | 3/2012 | Hammad et al. |
| 2002/0007352 | A1 | 1/2002 | Fieschi et al. |
| 2002/0035622 | A1 | 3/2002 | Barber |
| 2002/0077978 | A1 | 6/2002 | O'Leary et al. |
| 2003/0050896 | A1 | 3/2003 | Wiederin |
| 2003/0093367 | A1 * | 5/2003 | Allen-Rouman et al. ...... 705/39 |
| 2003/0140004 | A1 | 7/2003 | O'Leary et al. |
| 2003/0154406 | A1 | 8/2003 | Honarvar et al. |
| 2004/0019564 | A1 | 1/2004 | Goldthwaite et al. |
| 2004/0078340 | A1 | 4/2004 | Evans |
| 2005/0097320 | A1 | 5/2005 | Golan et al. |
| 2005/0122209 | A1 | 6/2005 | Black |
| 2005/0240527 | A1 | 10/2005 | Goldman |
| 2005/0273442 | A1 | 12/2005 | Bennett et al. |
| 2005/0278542 | A1 | 12/2005 | Pierson et al. |
| 2006/0006224 | A1 | 1/2006 | Modi |
| 2006/0010072 | A1 | 1/2006 | Eisen |
| 2006/0156385 | A1 | 7/2006 | Chiviendacz et al. |
| 2007/0124801 | A1 | 5/2007 | Thomas |
| 2007/0143230 | A1 | 6/2007 | Narainsamy et al. |
| 2007/0174448 | A1 | 7/2007 | Ahuja et al. |
| 2007/0214151 | A1 | 9/2007 | Thomas et al. |
| 2007/0234409 | A1 | 10/2007 | Eisen |
| 2007/0239606 | A1 | 10/2007 | Eisen |
| 2007/0244830 | A1 | 10/2007 | Hilderman |
| 2008/0005037 | A1 * | 1/2008 | Hammad et al. ................ 705/67 |
| 2008/0040276 | A1 | 2/2008 | Hammad et al. |
| 2008/0087722 | A1 | 4/2008 | Collins |
| 2008/0103972 | A1 | 5/2008 | Lanc |
| 2008/0104684 | A1 | 5/2008 | Lunde et al. |
| 2008/0120507 | A1 | 5/2008 | Shakkarwar |
| 2008/0133420 | A1 | 6/2008 | Barber |
| 2008/0154760 | A1 | 6/2008 | Calabrese et al. |
| 2008/0244744 | A1 | 10/2008 | Thomas et al. |
| 2008/0255992 | A1 | 10/2008 | Lin |
| 2008/0288384 | A1 | 11/2008 | Collins et al. |
| 2008/0288405 | A1 | 11/2008 | John |
| 2008/0298588 | A1 | 12/2008 | Shakkarwar |
| 2008/0319896 | A1 | 12/2008 | Carlson et al. |
| 2008/0319904 | A1 | 12/2008 | Carlson et al. |
| 2009/0037213 | A1 | 2/2009 | Eisen |
| 2009/0048975 | A1 | 2/2009 | Felger |
| 2009/0049529 | A1 | 2/2009 | Felger |
| 2009/0055315 | A1 | 2/2009 | Felger |
| 2009/0083184 | A1 | 3/2009 | Eisen |
| 2009/0099961 | A1 | 4/2009 | Ogilvy |
| 2009/0204524 | A1 | 8/2009 | McGeorge |
| 2009/0271306 | A1 | 10/2009 | Pierson |
| 2010/0036749 | A1 | 2/2010 | Barber et al. |

FOREIGN PATENT DOCUMENTS

| | | |
|---|---|---|
| KR | 10-2004-0103581 A | 12/2004 |
| WO | 97/24825 A2 | 7/1997 |
| WO | 02/08974 A2 | 1/2002 |
| WO | 2004/081837 A1 | 9/2004 |
| WO | 2005/088901 A1 | 9/2005 |

OTHER PUBLICATIONS

European Office Action mailed on Aug. 22, 2012 for EP Patent Application No. 08771801.1, 12 pages.

International Search Report mailed Jan. 9, 2009, for PCT Patent Application No. PCT/US2008/067994, 2 pages.

Written Opinion of the International Searching Authority, mailed Jan. 9, 2009 for PCT Patent Application No. PCT/US2008/067994, 5 pages.

International Preliminary Report on Patentability mailed Jan. 14, 2010, for PCT Patent Application No. PCT/US2008/067994, 6 pages.

Australian Office Action mailed May 9, 2012, for AU Application No. 2008268407, 2 pages.

Supplementary European Search Report mailed Dec. 28, 2011, for EP Patent Application No. 08771801.1-2201, 10 pages.

International Search Report mailed on Aug. 5, 2008, for PCT Patent Application No. PCT/US07/71301, 1 page.

Written Opinion of the International Searching Authority mailed on mailed on Aug. 5, 2008, for PCT Patent Application No. PCT/US07/71301, 3 pages.

Australian Office Action mailed on Oct. 1, 2010, for AU Patent Application No. 2007261072, 5 pages.

Australian Notice of Acceptance mailed on Jun. 26, 2011, for AU Patent Application No. 2007261072, 3 pages.

Chinese Office Action mailed on Jan. 12, 2011, for CN Patent Application No. 200780022874.5, with English translation, 12 pages.

Chinese Office Action mailed on Oct. 21, 2011, for CN Patent Application No. 200780022874.5, with English translation, 15 pages.

European Search Report mailed on Feb. 28, 2011, for EP Patent Application No. 07812158.9, 7 pages.

Communication from the European Patent Office mailed on Dec. 22, 2011, for EP Patent Application No. 07812158.9, 7 pages.

Russian Office Action received Nov. 18, 2011, for RU Patent Application No. 2009101310/08(001608), English translation only, 7 pages.

Australian Office Action mailed Dec. 14, 2012 for AU Application No. 2008268407, 3 pages.

* cited by examiner

SEEDING CHALLENGES FOR PAYMENT TRANSACTIONS

CLAIM OF PRIORITY

The present application is a non-provisional application of and claims priority to U.S. Provisional No. 60/946,113, filed on Jun. 25, 2007 entitled "PAYMENT TRANSACTION SYSTEM AND METHOD," the entire contents of which are herein incorporated by reference for all purposes.

CROSS-REFERENCES TO RELATED APPLICATIONS

The present application is related to U.S. patent application Ser. No. 11/763,240, filed on Jun. 14, 2007 entitled "CONSUMER AUTHENTICATION SYSTEM AND METHOD," which is incorporated by reference in its entirety for all purposes.

BACKGROUND OF THE INVENTION

The present application is generally related to payment transactions, and more specifically to the use of challenge questions in authorizing a transaction.

It is desirable to have mechanisms that ensure that a consumer who is using a portable consumer device such as a credit card is really the consumer who is associated with the credit card. Fraudulent activity can be very costly to merchants, issuers of portable consumer devices, and others.

A number of consumer authentication mechanisms are known. In one example of a conventional consumer authentication process, a consumer may purchase gas at a gas station using his credit card. Before the consumer is allowed to buy the gas and before the authorization request message is sent to the issuer of the portable consumer device, the gas pump may request that the consumer supply his zip code. The answer supplied by the consumer is then compared against a zip code obtained, for example, from the records of the issuer of the credit card or records from some other third party.

This authentication request may be provided by the merchant as a way to ensure that the consumer is in fact the consumer associated with the credit card. The gas station wants to verify that the consumer is authentic, since the gas station may bear some of the risk for any fraudulent activity that results from purchases made at the gas station.

While such conventional authentication methods have some effectiveness, there are still problems. For example, conventional authentication requests typically reuse the same questions. If someone has stolen a consumer's portable consumer device and knows the consumer's zip code (possibly obtained from the same third party), for example, that person could still conduct fraudulent transactions using the authentic portable consumer device. As there may be limited number of known data that can be used as a correct answer to a question posed to the consumer, it may not be hard for a thief to obtain such information. The data may be public (e.g., in a phone listing or on the Internet) or obtainable for purchase from a third party if requested under false pretenses.

Better ways to authenticate consumers using portable consumer devices are desirable. Embodiments of the invention address the above problems, and other problems, individually and collectively.

BRIEF SUMMARY OF THE INVENTION

Embodiments of the invention can be used to seed and deductively verify a response to a challenge question. The verified response and challenge question may then be used to authenticate a consumer as part of an authorization process. In this manner, an entity or system that is used to create challenge questions is less likely to be compromised and can generate valid data for posing challenge questions without having to rely on buying or receiving the data from a third party.

One embodiment of the invention is directed to a method comprising providing a challenge message to a consumer, wherein a correct response to the challenge message is not known by an entity issuing the challenge message. A first challenge response that is responsive to the challenge message is received from the consumer. Providing the challenge message to the consumer and receiving a subsequent challenge response are then repeated during each of one or more processes for authorizing a respective transaction requested by the consumer. In some embodiments, none of the subsequent challenge responses are used in a determination of whether the consumer is authorized to make any of the respective transactions. Subsequent challenge responses may be generated by transactions conducted by the consumer at various locations and/or with various different merchants. A verified answer to the challenge message is inferred based at least on a similarity of the received challenge responses. The challenge message, the verified answer, and another challenge response that is responsive to the challenge message is then used in a process for determining whether the consumer is authorized to make another transaction.

Another embodiment of the invention is directed to a method where a consumer receives from an entity a challenge message for a first time. The consumer provides to the entity a first challenge response that is responsive to the challenge message. Receiving the challenge message and providing a subsequent challenge response is then repeated during each of one or more processes for authorizing a respective transaction initiated by the consumer. The subsequent challenge responses are provided to facilitate a verification of an answer to the challenge message. In some embodiments, none of the subsequent challenge responses affect whether the consumer is authorized to make any of the respective transactions.

An authorization request message, which is associated with a consumer conducting another transaction with a portable consumer device, is initiated and sent to an issuer associated with the portable consumer device. The consumer receives from the entity the challenge message during a process for authorizing the another transaction. The consumer provides the entity with another challenge response. The consumer then receives an authorization response message that indicates whether or not the another transaction is authorized. The another transaction is more likely to be authorized if the another challenge response is similar to the verified answer.

Other embodiments of the invention are directed to systems, portable consumer devices, and computer readable media associated with the above-described methods.

These and other embodiments of the invention are described in further detail below with reference to the Figures and the Detailed Description.

DETAILED DESCRIPTION OF THE INVENTION

Currently, consumer authentication using challenge questions is typically performed at the merchant. The merchant asks the consumer for identification such as a driver's license before allowing a purchase transaction with a portable consumer device to proceed. In some cases, it may be better to use data that have been collected by the entity posing the challenge questions. This data (responses to the challenge questions) may not be publicly available or at least not easily obtainable by a thief. Thus, such data is more secure and such data does not have to be purchased from another party.

Once a response to a challenge question has been sufficiently verified, the verified challenge and response may then be used to authenticate a consumer as part of a process for authorizing a transaction. For example, if the consumer answers the challenge question with the verified response, the consumer is more likely to be considered authenticated and authorized to make the transaction. In addition, the issuer and the payment processing organization have information such as recent purchase information and consumer purchasing behavior. Any of this information can also be used in authorizing a purchase transaction.

Some embodiments of the invention can be used with standard payment processing systems. Exemplary payment processing systems are described in further detail below.

The term verified as used herein means that the response has been deemed worthy to be used in some manner for determining whether a transaction requested by a consumer will be authorized. Up until verification, the responses are merely collected to deduce a verified response.

I. Authorization Using Challenges

Figure 1:
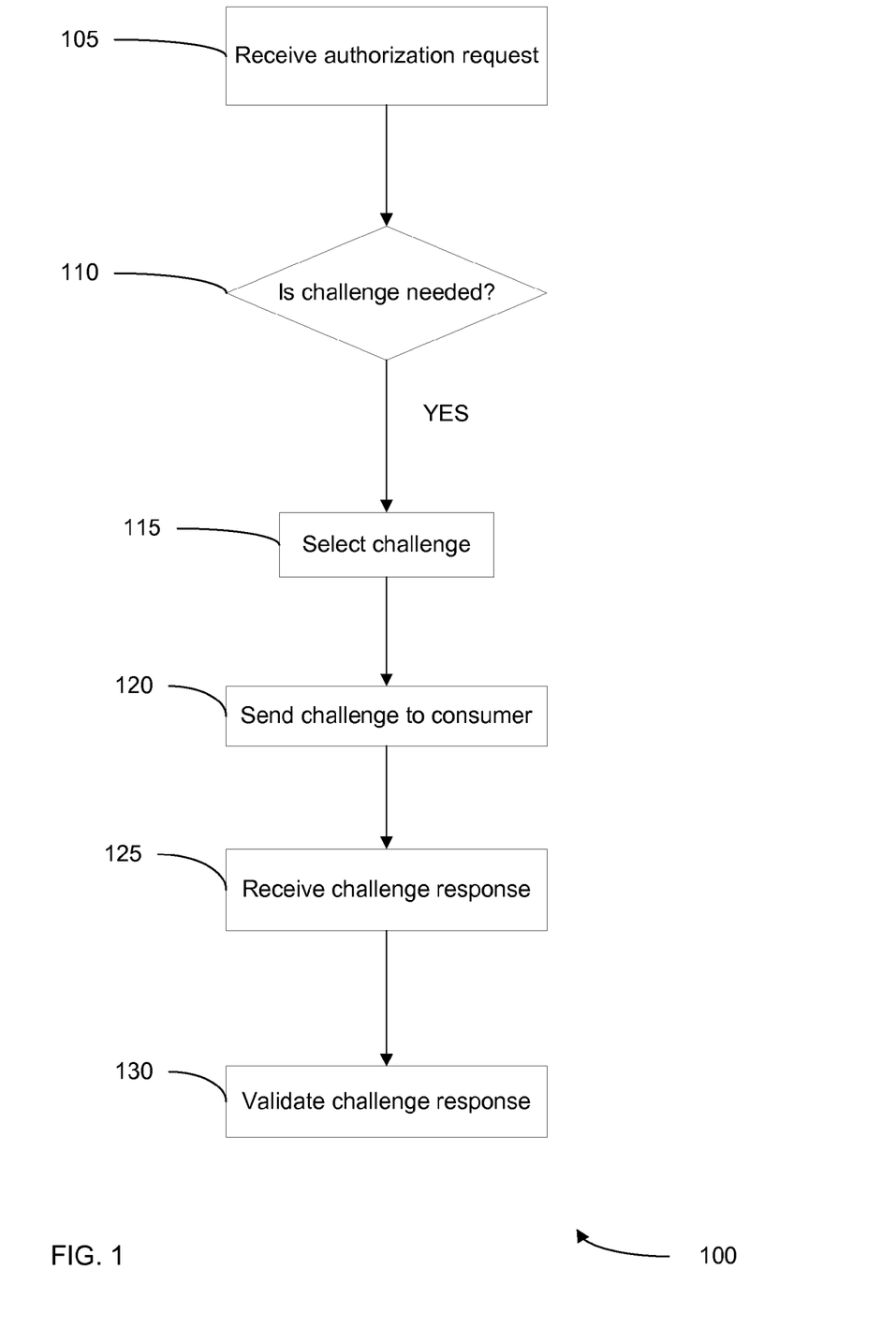
FIG. 1 is a flow diagram illustrating a method for authorizing a transaction that may be improved by an embodiment of the present invention.

FIG. 1 is a flow diagram illustrating a method 100 for authorizing a transaction that may be improved by an embodiment of the present invention. In a typical purchase transaction, a consumer purchases a good or service at a merchant using a portable consumer device, such as a credit card. The consumer's portable consumer device can interact with an access device such as a POS (point of sale) terminal at the merchant. Typically, the interaction causes an authorization request to be sent to an authorization system, which may be termed an initiation of the authorization request message. The authorization request messages may have information such as BINs (bank identification numbers), transaction amounts, account numbers, service codes, etc.

In step 105, the authorization system receives the authorization request message. In one embodiment, the first authorization request message is sent through a payment processing network and received at a payment processing network server and the payment processing network server.

In step 110, it is determined if a challenge is needed. Various criteria may be used to determine if a challenge is needed. For example, the payment processing network server may determine that the particular transaction is a high value transaction (e.g., greater than $1000) and that a challenge is therefore appropriate. In another example, the payment processing network server may determine that there is something suspicious about the present transaction and may thereafter determine that a challenge is appropriate. For example, the payment processing network server may determine that the portable consumer device is currently being used at a location which is different from the consumer's home state, and the consumer's recent purchase history suggests that the consumer is not traveling.

In step 115, a challenge question may then be selected or fetched, e.g., from a challenge question database. In step 120, the authorization system sends an authorization response message to the access device via the merchant. The first authorization response message may contain data representing the challenge question or an order to the access device to issue a challenge based on a set of preloaded question in the access device. Once the challenge question is received at the access device, the consumer supplies the challenge response to the access device. The challenge response may be supplied to the access device in any suitable manner (e.g., through a keypad, contactless reader, etc.). The access device can then forward the challenge response to the authorization system.

In step 125, the authorization system receives the challenge response. The challenge response (or the challenge and response or the challenge pointer and response) message may be part of a second authorization request message. In step 130, the payment processing network server can then validate the challenge response message.

If the challenge response message is not validated, then the payment processing network server may send a response message back to the access device indicating that that transaction is not approved. If the challenge response message is validated, the authorization system may send an approval to the access device or may send an indication to another system or party (e.g. an issuer) that the consumer has satisfied any challenges posed by the payment processing network. The issuer may then approve or disapprove the transaction based on other criteria.

At the end of the day, a normal clearing and settlement process can be conducted by the transaction processing system. A clearing process is a process of exchanging financial details between and acquirer and an issuer to facilitate posting to a consumer's account and reconciliation of the consumer's settlement position. Clearing and settlement can occur simultaneously.

The method described with respect to FIG. 1 can be characterized as a "closed channel" process since the access device receives a challenge question and provides a response to the challenge question. However, other embodiments of the invention may use open channel solutions whereby a challenge question may be sent to a device other than the access device which sent the first authorization response message.

Figure 2:
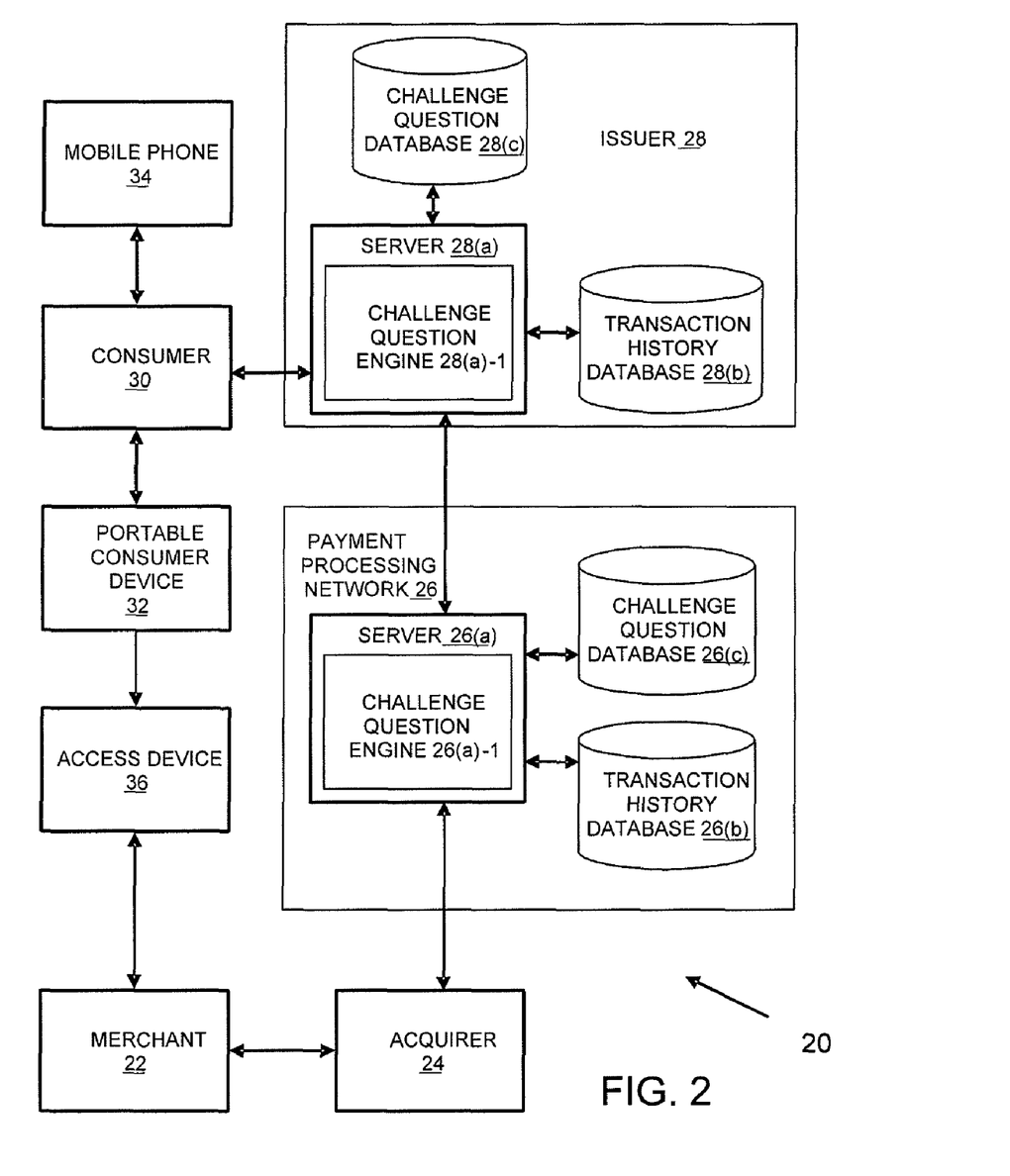
FIG. 2 shows an exemplary system according to an embodiment of the present invention.

FIG. 2 shows an exemplary system 20 according to an embodiment of the present invention. Other systems according to other embodiments of the invention may include more or less components than are shown in FIG. 2.

The system 20 shown in FIG. 2 includes a merchant 22 and an acquirer 24 associated with the merchant 22. In a typical payment transaction, a consumer 30 may purchase goods or services at the merchant 22 using a portable consumer device 32. The acquirer 24 can communicate with an issuer 28 via a payment processing network 26. The merchant 22 could alternatively be connected directly to the payment processing network 26. The consumer 30 may be an individual, or an organization such as a business that is capable of purchasing goods or services. The consumer 30 may optionally operate a wireless phone 34.

The portable consumer device 32 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

An exemplary portable consumer device in the form of a phone may comprise a computer readable medium and a body. The memory of the computer readable medium preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the portable consumer device 32.

The portable consumer device 32 may further include a contactless element, which is typically implemented in the form of a semiconductor chip (or other data storage element) with an associated wireless transfer (e.g., data transmission) element, such as an antenna.

The portable consumer device 32 may also include a processor (e.g., a microprocessor) for processing the functions of the portable consumer device 32 and a display to allow a consumer to see phone numbers and other information and messages. The portable consumer device 32 may further include input elements to allow a consumer to input information into the device, a speaker to allow the consumer to hear voice communication, music, etc., and a microphone to allow the consumer to transmit her voice through the portable consumer device 32. The portable consumer device 32 may also include an antenna for wireless data transfer (e.g., data transmission). These characteristics may also be present in the phone 34.

The payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 26 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

As shown in FIG. 2, the payment processing network 26 may comprise a server 26(a), which may comprise a challenge question engine 26(a)-1. The server 26(a) may also be in communication with a transaction history database 26(b) and a challenge question database 26(c). As will be explained in further detail below, the challenge question engine 26(a)-1 may simply extract challenge questions from the challenge question database 26(c). Alternatively or additionally, the challenge question engine 26(a)-1 may generate challenge questions using information in the transaction history database 26(b).

The challenge question database 26(c) may be populated with questions of any suitable type. The questions may relate to a past location (e.g., the consumer's current home, the city that the consumer recently visited) or current location (e.g., the current location of the store that the consumer is currently at), the type or name of the merchant that the consumer is presently visiting or has visited in the past, the consumer's family or personal data (e.g., name, phone number, social security number, etc.), etc. The questions in the challenge question database 26(c) may be generated by the challenge question engine 26(a)-1 and subsequently stored in the challenge question database 26(c).

Alternatively, or additionally, the challenge questions may be generated from an external source and then subsequently stored in the challenge question database 26(c). For example, the consumer 30 may use a browser on a personal computer or the like to supply specific challenge questions to the server 26(a) via a communication medium (not shown) such as the Internet.

The merchant 22 may also have, or may receive communications from, an access device 36 that can interact with the portable consumer device 32. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

The issuer 28 may be a bank or other organization that may have an account associated with the consumer 30. The issuer 26 may operate a server 28(a) which may have a challenge question engine 28(a)-1. A transaction history database 26(b) and a challenge question database 28(c) may be in communication with the server 28(a). The issuer server 28(a), challenge question engine 28(a)-1, transaction history database 26(b), and challenge question database 28(c) may operate in the same way or a different way than the payment processing network server 28(a), challenge question engine 28(a)-1, transaction history database 28(b), and challenge question database 28(c). The above-descriptions as to elements 26(a), 26(a)-1, 26(b), and 26(c) may apply to elements 28(a), 28(a)-1, 28(b), and 28(c).

Embodiments of the invention are not limited to the above-described embodiments. For example, although separate functional blocks are shown for an issuer, payment processing network, and acquirer, some entities perform all or any suitable combination of these functions and may be included in embodiments of invention. Additional components may also be included in embodiments of the invention.

As mentioned above, it is desirable to seed challenge questions and deduce (infer) verified responses for use in the authentication process.

II. Authorization Using Seeded Challenges

Figure 3:
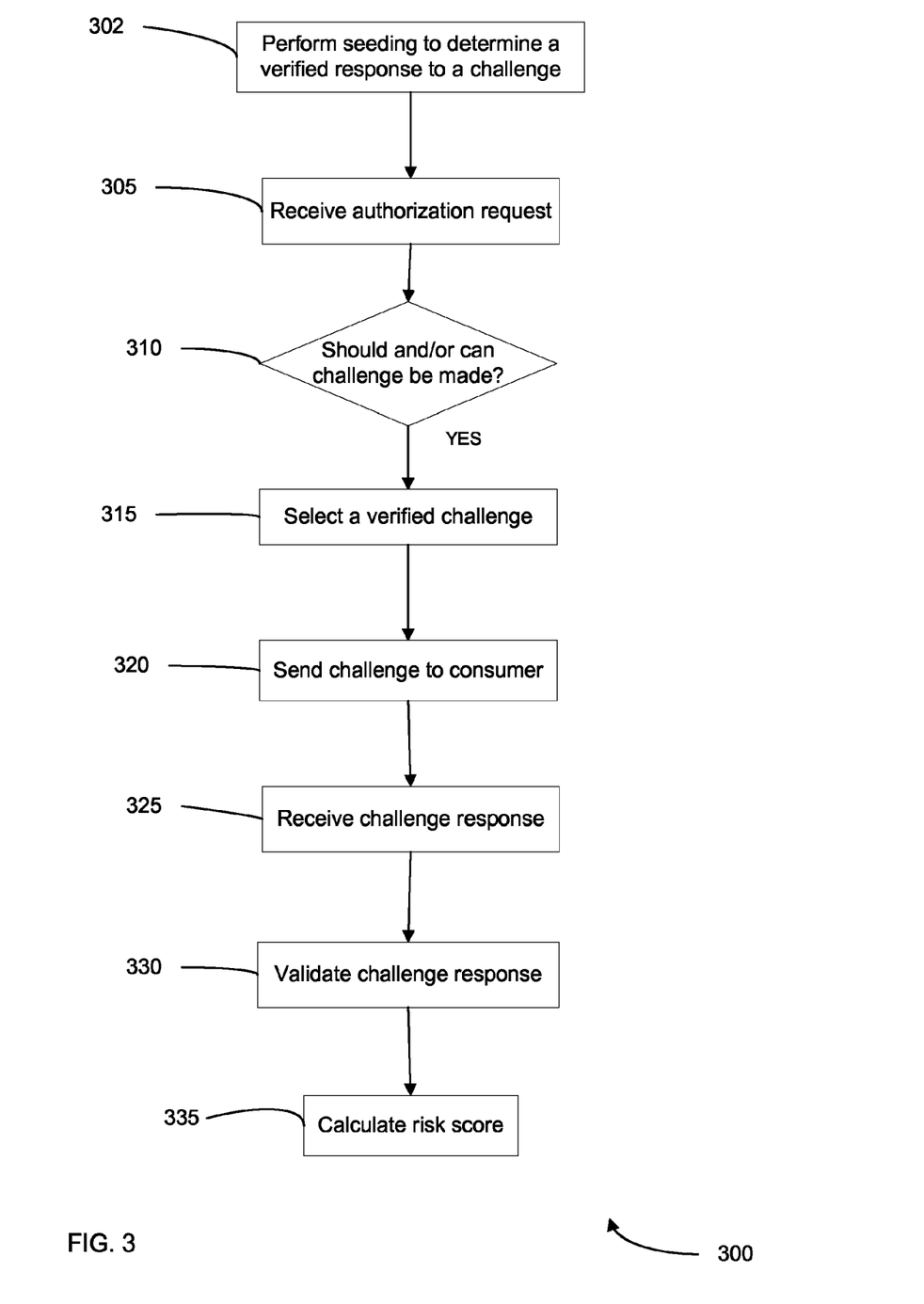
FIG. 3 is a flow diagram illustrating a method for determining a verified response to a challenge question and using the verified response in an authorization process according to an embodiment of the present invention.

FIG. 3 is a flow diagram illustrating a method 300 for determining a verified response to a challenge question and using the verified response in an authorization process according to an embodiment of the present invention. Method 300 may be performed, for example, when a correct answer is not known to any number of challenge questions, when new challenge questions and corresponding responses are desired, and/or when a proprietary access to data is desired. Reference is also made to FIG. 2.

In step 302, seeding is performed to deduce a verified response to a challenge question. During seeding, a challenge question is proposed to the consumer, who then responds with a response to the challenge. This can be done multiple times. For example, the challenge question may be presented to the consumer 30 via the access device 36 or the mobile phone 34. The challenge question may originate from the issuer 28 or the payment processing network 26. A response is verified after the consumer 30 consistently provides the same or similar response. Up until verification, the responses are merely collected to deduce a verified response, and may not be actively used in an authorization process. That is, the challenge response does not impact or affect the authorization outcome, until the response to the challenge question is verified. This seeding/deducing process will be discussed in detail below.

In step 305, the authorization system receives an authorization request message. For example, the issuer 28 may receive an authorization request message from the merchant 22 via the acquirer 24 and the payment processing network 26 after the consumer 30 interacts with the access device 36 using the portable consumer device 32. In step 310, it is determined if a challenge should and/or can be made. For example, the issuer 28 and/or the payment processing network 26 can determine if a challenge should and/or can be made. In addition to criteria previously mentioned for determining whether a challenge is needed the following criteria may be used.

To determine whether a challenge should be made, it may be ascertained whether the issuer 28 participates in an authorization program. Another criteria is whether the issuer 28 or the payment processing network 26 makes the challenge decision. Another criteria is whether there is an available challenge channel, e.g., means for the consumer to view a challenge question and respond accordingly. The channel may flow directly to the merchant or may bypass the merchant and flow directly to the consumer, e.g. through his phone. Another criteria is whether or not the merchant is trusted or exempt, e.g., a merchant who used a type of biological identification (fingerprint, retina scan, etc.) may be trusted. Repeat customers to a specific merchant may also be exempt. For example, if a customer regularly uses a gas station near his home, that customer can be considered authentic without challenge. Further, a consumer may also be exempt if an advanced (initial) authorization score for the transaction is excellent, which may be based on criteria mentioned herein. These criteria may be used to determine whether or not to issue a challenge.

To determine whether a challenge and/or what type of challenge can be made, it may be ascertained what is the form factor that the consumer is attempting initiate the transaction, e.g., whether the person is making the purchase over the Internet, at a brick and mortar business, or through a mobile device. If the person, is making the purchase over the Internet then he/she will be able to answer any type of question with a keyboard. A separate pop up window may be used for implementing challenge process. In contrast, brick and mortar stores may not have access to a keyboard, and thus possibly no challenges may be made, only yes or no questions, or possibility only limited to numeric answers.

Additionally, if there is no form factor at or through the merchant 22, then it may be checked whether the consumer 30 may be contacted directly with the challenge question. For example, a text message may be sent to the consumer's phone 34 with a challenge question to be answered.

In step 315, if a challenge should and can be made, a challenge question may then be selected or fetched, e.g., from a challenge question database 28(*c*). In step 320, the authorization system, which can include the issuer 28 or the payment processing network 26, sends an authorization request message to the access device 36, e.g., via the merchant 22. The first authorization request message may contain data representing the challenge question or an order to the access device 36 to issue a challenge based on a set of preloaded question in the access device 36. Once the challenge question is received at the access device 36, the consumer 30 supplies the challenge response to the access device 36. The access device 36 can then forward the challenge response to the authorization system including the issuer 28 via the merchant 22, acquirer 24, and the payment processing network 26.

The questions asked may also have static or dynamic (semi-dynamic or fully dynamic) answers. For example, the question "What is your birthday?" requires a static answer, since the answer does not change. The question "What is your zip-code?" requires a semi-dynamic answer, since it could change or can change infrequently. Note that multiple challenge questions may be used during a single authorization process.

In step 325, the authorization system including the issuer 28 receives the challenge response from the consumer 30. In step 330, the issuer server 28(*a*) (or the payment processing network server 26(*a*)) can then validate the challenge response message, which at some confidence level authenticates the identity of the consumer 30.

In step 335, after the challenge response has been validated as being correct or incorrect, a risk score may be provided to the issuer 28 for use in determining whether to authorize the transaction. The risk score may account for correctness of the challenge response, the place of purchase, the history of the card, the amount of the purchase, or any combination of the other criteria mentioned herein. Thus, if an incorrect response is provided, the transaction is not necessarily denied. Also, more than one challenge can be used. If two challenges are used and the response to both are wrong, then there would be a greater chance that person would be turned down, i.e. a greater risk score. If one is wrong and the other right, then the total contribution to the risk score from the challenges may be zero or dependent on the confidence score (see below) of each challenge. One skilled in the art will appreciate the different contributions arising from multiple challenge questions.

The seeding process may be first started when a customer fills out a form, e.g., over the Internet. However, this one time occurrence does not establish enough consistency. Thus, at least some of the seeding process also occurs during an authorization process that does not use the challenge response to the particular challenge question that is being seeded. That is, the challenge response does not affect (is not a factor of) whether the transaction will be authorized. In one embodiment, all of the challenge responses are obtained during one or more authorization processes.

Figure 4:
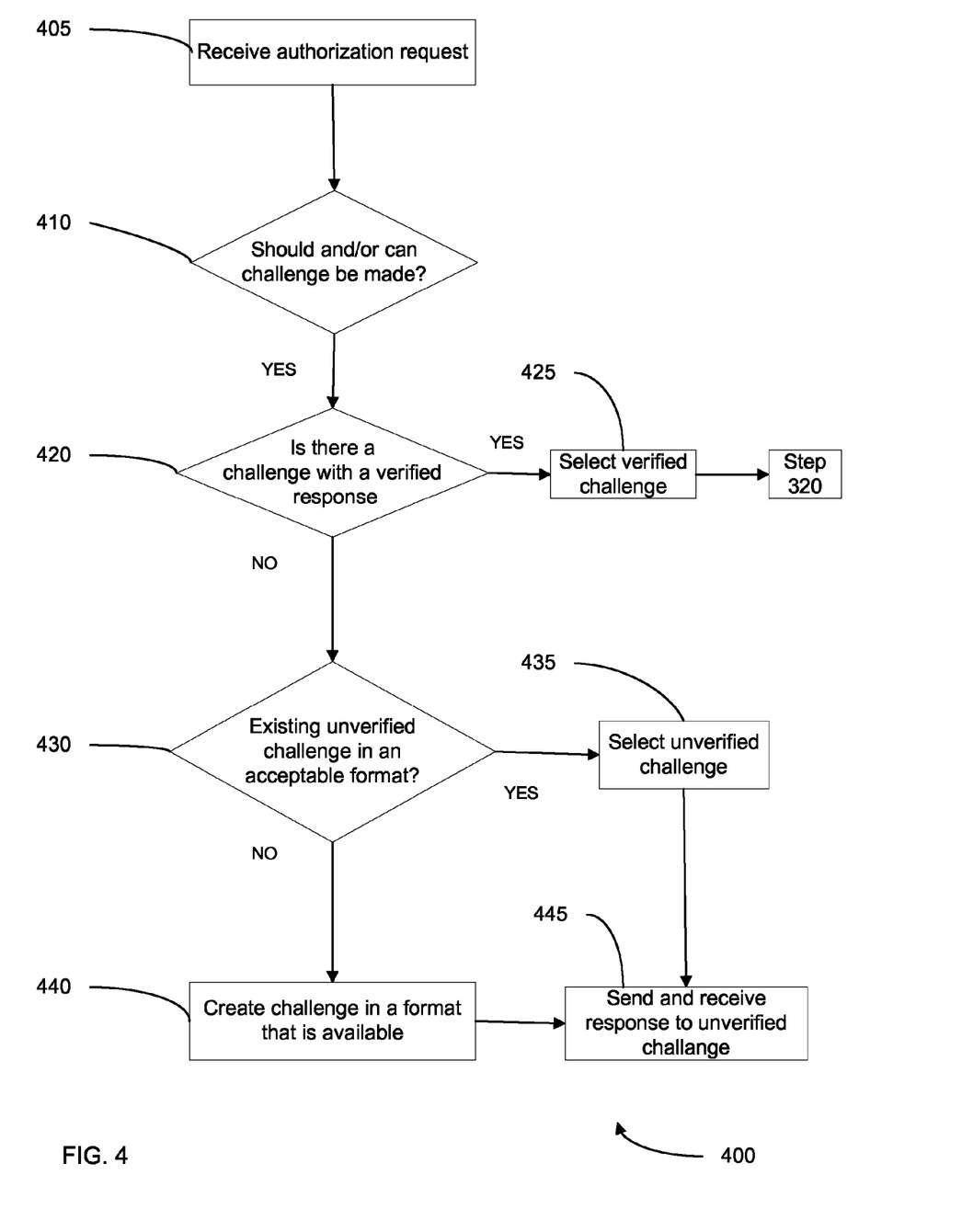
FIG. 4 is a flow diagram illustrating a method for determining a challenge to use in an authorization process according to an embodiment of the present invention.

FIG. 4 is a flow diagram illustrating a method 400 for determining a challenge to use in an authorization process according to an embodiment of the present invention. In step 405, the authorization system including payment processing network 26 (and/or the issuer 28) receives an authorization request message from the consumer 30 via the merchant 22, acquirer 24, and the payment processing network 26. In step 410, it is determined if a challenge should and/or can be made.

In step 420, if a challenge should and can be made, it is determined whether at least one challenge with a response that has already been verified exists. This may be present in the challenge question database 26(c). If a verified response already exists, one or more verified challenges are selected from the database 26(c) by the challenge question engine 26(a)-1. The authorization request may then be processed as in method 300 from step 320 and on.

In step 430, if there is not a verified challenge, it is determined (e.g., by the payment processing network server 26(a) or the issuer server 28(a)) whether an unverified challenge exists in a format that the merchant 22 can process, or the consumer 30 can directly process. If an unverified challenge does exist in a format that the merchant 22 can process, then one or more of the unverified challenges are selected in step 435 (e.g., by the payment processing network server 26(a) or the issuer server 28(a). Accordingly, time and effort is advantageously not wasted trying to receive a challenge response that cannot be provided.

In step 445, the selected unverified challenge is sent to the consumer 30 via the access device 36, mobile phone 34, or even the portable consumer device 32 (if the portable consumer device 32 is a phone or computer). The response from the consumer 30 is received at the payment processing network 26 and/or the issuer 28. As noted later, if the response shows a consistency that makes the challenge verified with that particular response, it may be used in the calculation of the risk score. Thus, the term verified can mean that the response is used in some manner to determine whether the transaction will be authorized.

If an unverified challenge does not exist in a format that the merchant 22 can process, then at step 440 a challenge is optionally created in a format that the merchant 22 can process. In step 445, the newly created unverified challenge may also be sent to the consumer 30 (e.g., via the access device 34) and the response from the consumer 30 is received (e.g. from the access device 36) at the payment processing network 26 or the issuer 28.

Note that step 430 may still be done even if there is a verified response that exists. This may be done in order to build a larger database of verified challenges. Similarly, even if there is an unverified response that the merchant 22 can process, a new challenge may be created and sent also in order to build a larger database of verified challenges.

The determination of when a response, and thus the corresponding challenge, is verified can depend on different factors. At least one of the factors is a similarity in the responses received.

III. Verifying Challenges and Determining Reliability of Responses

Figure 5:
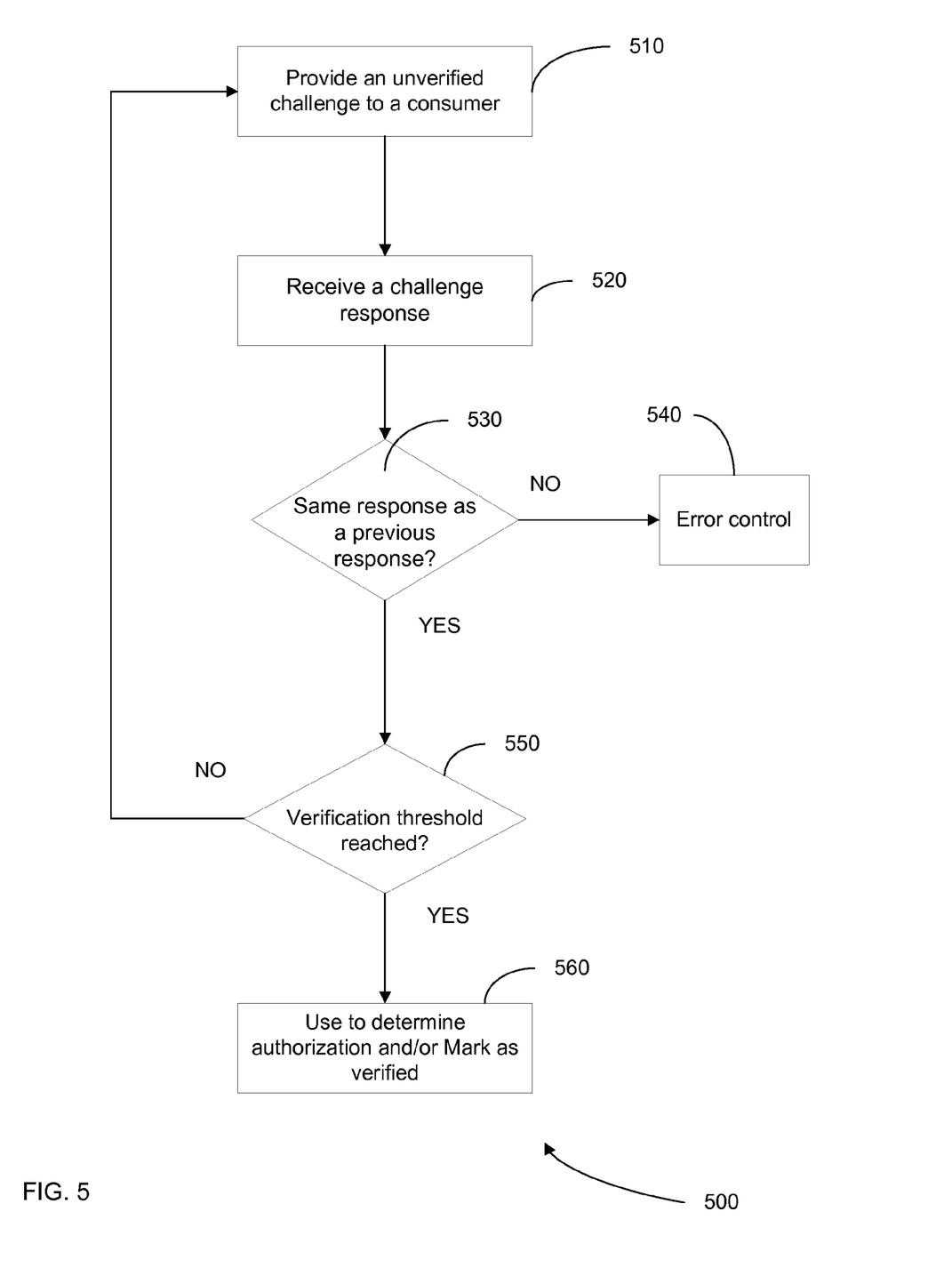
FIG. 5 is a flow diagram illustrating a method for determining a verified response during an authorization process according to an embodiment of the present invention.

FIG. 5 is a flow diagram illustrating a method 500 for determining a verified response during an authorization process according to an embodiment of the present invention. In step 510, an unverified challenge is provided to a consumer 30 as previously described. In step 520, the challenge response is received from the consumer 30 as previously described.

In step 530, the payment processing network server 26(a) and/or the issuer server 28(a) determines whether the response is the same or similar as one or more previous responses from the consumer 30. Similar answers may be taken as well depending on the question. For example, if the difference is a small typographical error, then a consistency between the two answers may be inferred. For example, if the question is the place of your birth and past responses have been "Kansas City", then a misspelled response of "Kansas Ciry" may be taken to be the same answer.

In step 550, if it is determined that the response is the same a previous response, then it is determined whether a verification threshold has been reached. In one embodiment, the verification threshold is simply a count for the number of times that the response has been similar. For example, if the response has been the same the last N times, the response (and corresponding challenge) are deemed verified. The number N may be viewed as a threshold value, such that the count is equal to or greater than N before is verified. Similarly, a threshold of N−1 could be used where the determination is whether the count is greater than N. One skilled in the art will appreciate the breadth of the types of embodiments possible.

In another embodiment, the verification threshold accounts for a consistency across all or a certain segment of responses even if some of them have been wrong. The percentage of the last N responses that are correct may be used to determine whether the response is to be verified. Note that a minimum number of responses may be required. For example, if at least 10 responses have been received, and at least 90% (9 responses) are similar then the response may be verified.

Other criteria may also be used besides the level of consistency in the similarity between responses. For example, the amount of time that the consumer has had the portable consumer device may be also used. One way of enumerating this amount of time is the number of billing cycles that the consumer has had the card. Thus, in one embodiment, if the answer is similar three times in a row and the consumer has kept the card for 4 billing cycles, then the challenge question/answer may be used in the authorization process, e.g., to authenticate the consumer. Other criteria can include whether there have been any charge backs on the card (i.e. a transaction reversed is at a later time), where the responses have been made (such as at home, a trusted merchant, or someplace else), or any other criteria mentioned herein or known to one skilled in the art.

If it is determined that the response is not the same as a previous response, then an error control is performed in step 540. In one embodiment, the error control process resets the count for the number of times that the response has been similar. In one aspect, this results in a restart of the seeding process. This may occur, for example, when the actual correct answer has changed. The consumer may have moved, and thus his zip code may actually be different; therefore, the inferred correct answer will be different.

In another embodiment, the error control may do nothing, such as might be the case when a percentage of similar answers are being used. Other criteria may be analyzed to determine if the seeding process should be restarted, such as looking at the recent activity on the credit card, where the current transaction is taking place, or other criteria mentioned herein. The error control may also perform other actions related to safeguarding the account when the answer is different.

A verified challenge may also be affected by the response from the consumer. For example, some challenge questions may be more reliable (confidence score) than other ones. The more reliable challenge questions may affect the risk score more. Thus, a more accurate and efficient risk may be achieved.

Figure 6:
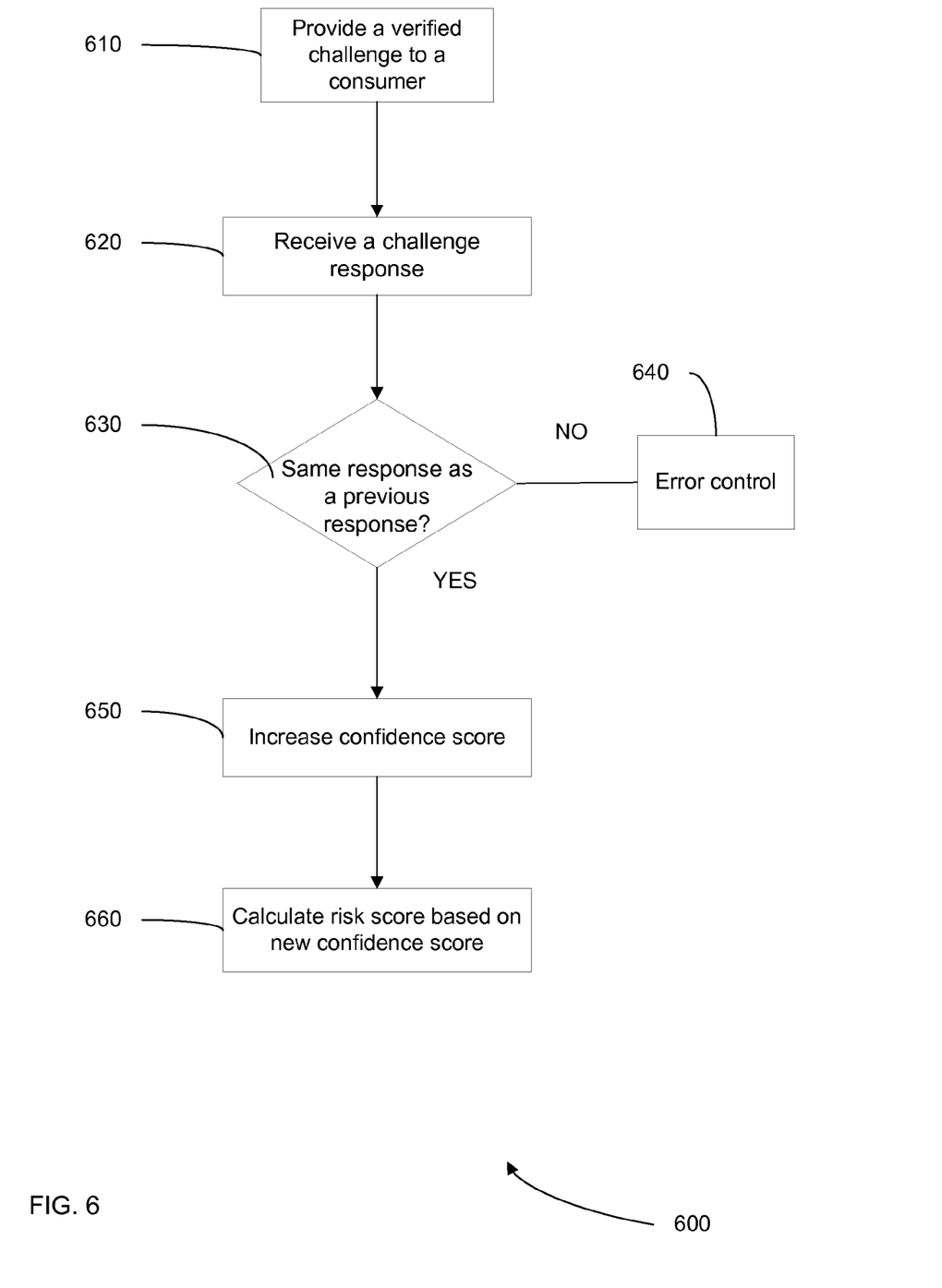
FIG. 6 is a flow diagram illustrating a method for performing an authorization of a transaction using a verified challenge response according to an embodiment of the present invention.

FIG. 6 is a flow diagram illustrating a method 600 for performing an authorization of a transaction using a verified challenge response according to an embodiment of the present invention. In step 610, a verified challenge is provided by the issuer 28 and/or the payment processing network 26 to a consumer 30 as previously described (e.g., either using the mobile phone 34, portable consumer device 32, or access device 36). In step 620, the challenge response is received from the consumer 30 at the payment processing network 26 or the issuer 28.

In step 630, the payment processing network server 26(*a*) or the issuer server 28(*a*) determines whether the response is the same or similar as one or more previous responses. This analysis may be performed as in the step 530 of method 500.

In step 650, if it is determined that the response is the same as a previous response, then a confidence score associated with the challenge may be increased. A confidence score reflects a level of how reliable the response is for authenticating the identity of the consumer. Examples of a confidence score may be a value between 0 and 1, a percentage between 0 and 100, or any other suitable values, which may have any scaling factor.

The confidence score may increase differently each time the same response is received. For instance, the confidence score might increase more for the responses received earlier. A confidence score may also increase less if suspect behavior had just occurred with the credit card. Thus, other criteria may be affect the confidence score. For example, that the card has not been canceled can also increase the reliability (confidence score) or the risk score. Different confidence scores may also increase different amounts.

In one aspect, the confidence score may be used as a weighting in determining the overall risk score, or similarly whether the user is considered to be authenticated. For example, an inconsistent (not similar) response to a challenge with a high confidence score will have a greater impact on the risk score than would an inconsistent response. Each challenge question posed during an authorization process may have a different confidence score.

In one embodiment, the confidence score simply multiplies a one or a zero, depending whether that particular response is similar. In another embodiment, the confidence score is used in a more complex function as an input or an offset.

In one embodiment, the confidence scores of challenges that have just become verified will vary. In another embodiment, the confidence score of each verified challenge is the same (e.g. 30%) after it is verified.

In step 660, whether a similar response was received, along with the corresponding confidence score, is used to determine a risk score for a transaction. In one embodiment, the newly updated confidence is used. In another embodiment, the confidence score after the last transaction is used. Past transactional information may be stored in a database such as the transaction history database 26(*b*).

In step 640, an error control may be performed as in method 500 when the response is not similar. Even if the response is not similar, a risk score may still be calculated. In one embodiment, as part of the error control, the challenge is labeled as not verified any more. In one aspect, the verification process is completely restarted. Thus, the count would be reset to zero or the percentage of similar responses would be reset to 0%.

In another aspect, the verification process is started midstream. For example, the percentage of past responses that are viewed as similar might not become 0% and the minimum number of transaction may already be considered as met (i.e. the responses of the last N transaction may be kept). The decision as to whether to completely restart the verification process may be based at least in part on other criteria mentioned herein and known to one skilled in the art. Once a challenge becomes verified again, its confidence score may reflect the process of re-verification. That is a challenge that has become re-verified might have a lower or higher confidence score than a challenge that has become verified for a first time.

In another embodiment, the challenge stays verified, but its confidence score is decreased.

Figure 7:
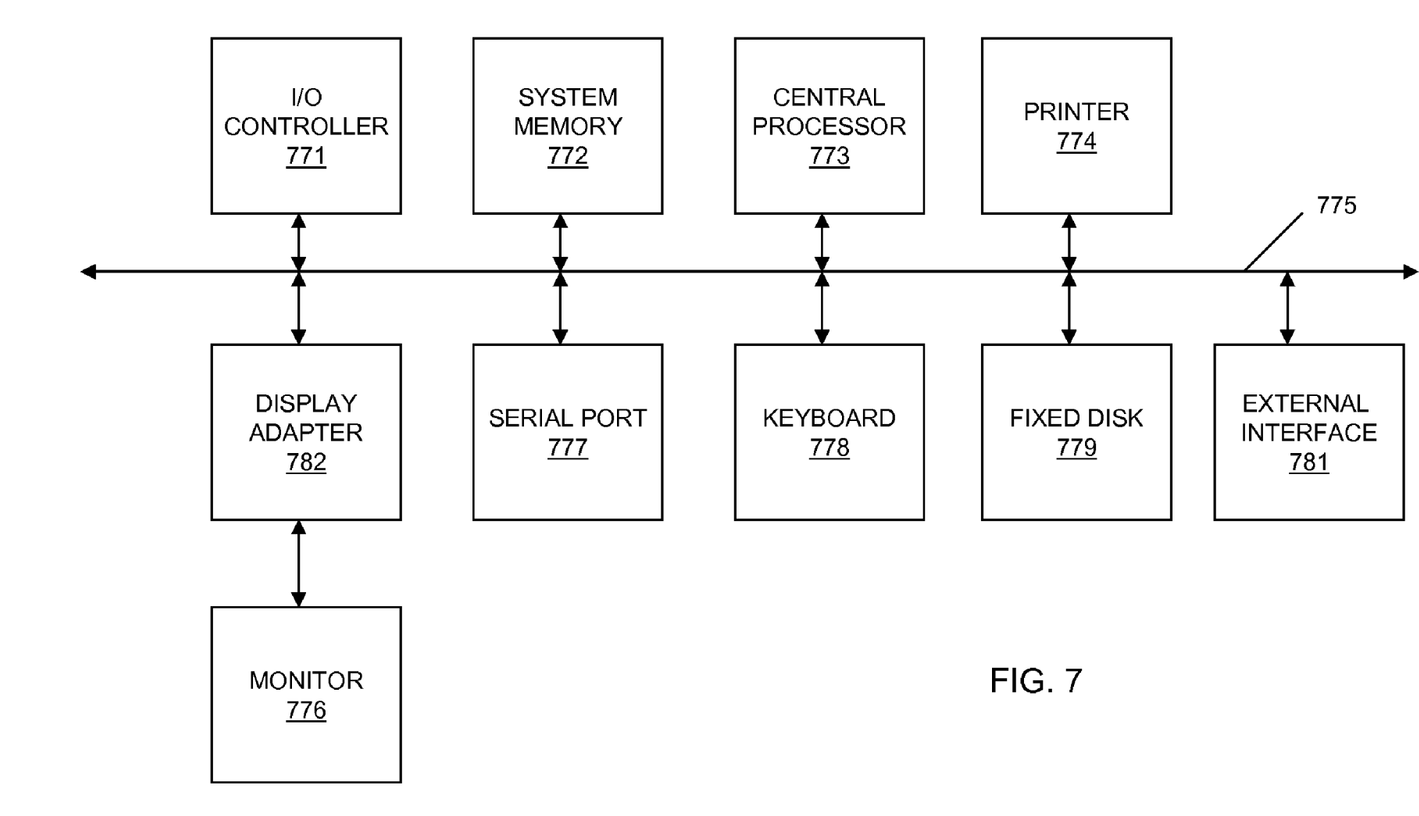
FIG. 7 shows a block diagram of a computer apparatus.

Any of the servers 26(*a*), 28(*a*), and the access device 36 may utilize any suitable number of subsystems. Examples of such subsystems or components are shown in FIG. 7. The subsystems shown in FIG. 7 are interconnected via a system bus 775. Additional subsystems such as a printer 774, keyboard 778, fixed disk 779, monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

Embodiments of the invention provide for a number of advantages. For example, since challenge responses are verified on an "as you go" basis, embodiments of the invention do not require an issuer or payment processing organization to amass challenge questions and answers before a consumer starts conducting payment transactions (or money transfer transactions). If, for instance, a consumer does not conduct a great number of payment transactions, then significant time and resources need not be spent generating a collection of information for that consumer. Also, consumers are not required to "pre-register" before using embodiments of the invention. A consumer need not fill out a form to provide challenge response information up front. Thus, it is more likely that many consumers will use embodiments of the invention since consumers need not take the time to pre-register.

The specific details of the specific aspects of the present invention may be combined in any suitable manner without departing from the spirit and scope of embodiments of the invention. However, other embodiments of the invention may be directed to specific embodiments relating to each individual aspects, or specific combinations of these individual aspects.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. Computer programs incorporating features of the present invention may be encoded on various computer readable media for storage and/or transmission; suitable media include magnetic disk or tape, optical storage media such as compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
    during a first transaction, providing a challenge message to a consumer, wherein a correct response to the challenge message is not known by an entity issuing the challenge message;
    receiving, from the consumer, a first challenge response that is responsive to the challenge message, wherein the first challenge response is not used to authorize the first transaction;
    repeating the providing of the challenge message to the consumer and receiving a subsequent challenge response from the consumer during each of one or more processes for authorizing a respective other transaction requested by the consumer, wherein none of the subsequent challenge responses are used in a determination of whether the consumer is authorized to make any of the respective other transactions;
    one or more processors inferring a verified answer to the challenge message based at least on a similarity of the received challenge responses; and
    the one or more processors using the challenge message, the verified answer, and another challenge response that is responsive to the challenge message in a process for determining whether the consumer is authorized to conduct a later transaction which takes place after the respective other transactions.

2. The method of claim 1 wherein using the challenge message, the verified answer, and another challenge response comprises:
    comparing the another challenge response to the verified answer; and
    calculating a contribution to a risk score based on the comparison, wherein the risk score is used to determine whether or not to authorize the later transaction.

3. The method of claim 2 wherein calculating the contribution comprises using a confidence score associated with the verified answer as a factor in determining the contribution.

4. The method of claim 3 further comprising:
    increasing the confidence score of the verified answer when the another challenge response is similar to the verified answer.

5. The method of claim 1 wherein the first challenge response is received during a process of authorizing the first transaction requested by the consumer.

6. The method of claim 1, further comprising:
    inferring respective verified answers to one or more other challenge messages; and
    using the other challenge messages, their respective verified answers, and respective challenge responses in the determination of the later transaction.

7. The method of claim 1 wherein inferring the verified answer comprises:
    determining a consistency value for the received challenge responses;
    comparing the consistency value to a threshold value; and
    verifying the answer when a threshold criteria has been achieved.

8. The method of claim 7 wherein the consistency value is a number of consecutive responses that have been similar, wherein the threshold value is an integer N, and wherein the threshold criteria is whether the consistency value is at least one of greater than N or greater than or equal to N.

9. The method of claim 1 wherein the verified answer is inferred based also on one or more other criteria.

10. The method of claim 9 wherein the other criteria includes a number of billing cycles that the consumer has had a portable consumer device without suspect activity.

11. The method of claim 10, wherein the other criteria further includes whether any of the respective other transactions have been reversed.

12. The method of claim 10, wherein the other criteria further includes a location of the consumer when the subsequent challenge responses were received.

13. The method of claim 1, further comprising:
    resetting a process of inferring the verified answer when the another challenge response is different than the verified answer.

14. A non-transitory computer program product comprising a computer readable medium encoded with a plurality of instructions for controlling a computing system to perform an operation for determining whether a consumer is authorized to make a transaction, the instructions comprising:
    during a first transaction, providing a challenge message to a consumer, wherein a correct response to the challenge message is not known by an entity issuing the challenge message;
    receiving, from the consumer, a first challenge response that is responsive to the challenge message, wherein the first challenge response is not used to authorize the first transaction;
    repeating the providing of the challenge message to the consumer and receiving a subsequent challenge response from the consumer during each of one or more processes for authorizing a respective other transaction requested by the consumer, wherein none of the subsequent challenge responses are used in a determination of whether the consumer is authorized to make any of the respective other transactions;
    inferring a verified answer to the challenge message based at least on a similarity of the received challenge responses; and
    using the challenge message, the verified answer, and another challenge response that is responsive to the challenge message in a process for determining whether the consumer is authorized to conduct a later transaction which takes place after the respective other transactions.

15. The computer program product of claim 14 wherein the computer program product includes a server computer.

16. The computer program product of claim 14 wherein using the challenge message, the verified answer, and another challenge response comprises:
   comparing the another challenge response to the verified answer; and
   calculating a contribution to a risk score based on the comparison, wherein the risk score is used to determine whether or not to authorize the later transaction.

17. The computer program product of claim 16, wherein calculating the contribution comprises using a confidence score associated with the verified answer as a factor in determining the contribution.

18. The computer program product of claim 14, wherein inferring the verified answer comprises:
   determining a consistency value for the received challenge responses;
   comparing the consistency value to a threshold value; and
   verifying the answer when a threshold criteria has been achieved.

19. The computer program product of claim 18, wherein the consistency value is a number of consecutive responses that have been similar, wherein the threshold value is an integer N, and wherein the threshold criteria is whether the consistency value is at least one of greater than N or greater than or equal to N.

20. The computer program product of claim 14, wherein the verified answer is inferred based also on one or more other criteria, and wherein the other criteria includes a number of billing cycles that the consumer has had a portable consumer device without suspect activity.

21. A system comprising:
   an output configured to provide a challenge message to a consumer, wherein a correct response to the challenge message is not known by the system;
   an input configured to receive, from the consumer, a first challenge response that is responsive to the challenge message, wherein the first challenge response is not used to authorize the first transaction;
   one or more processors configured to:
      repeat the providing of the challenge message to the consumer and receiving a subsequent challenge response from the consumer during each of one or more processes for authorizing a respective other transaction requested by the consumer, wherein none of the subsequent challenge responses are used in a determination of whether the consumer is authorized to make any of the respective other transactions;
      infer a verified answer to the challenge message based at least on a similarity of the received challenge responses; and
      use the challenge message, the verified answer, and another challenge response that is responsive to the challenge message in a process for determining whether the consumer is authorized to conduct a later transaction which takes place after the respective other transactions.

22. The system of claim 21, wherein using the challenge message, the verified answer, and another challenge response comprises:
   comparing the another challenge response to the verified answer; and
   calculating a contribution to a risk score based on the comparison, wherein the risk score is used to determine whether or not to authorize the later transaction.

23. The system of claim 21, wherein inferring the verified answer comprises:
   determining a consistency value for the received challenge responses;
   comparing the consistency value to a threshold value; and
   verifying the answer when a threshold criteria has been achieved.

24. The system of claim 21, wherein the verified answer is inferred based also on one or more other criteria, and wherein the other criteria includes a number of billing cycles that the consumer has had a portable consumer device without suspect activity.

* * * * *